United States Patent [19]
Atkins

[11] Patent Number: 5,953,194
[45] Date of Patent: *Sep. 14, 1999

[54] ARRANGEMENT FOR PROTECTING TELECOMMUNICATIONS EQUIPMENT FROM VOLTAGE TRANSIENTS

[75] Inventor: Ian Paul Atkins, Swindon, United Kingdom

[73] Assignee: Raychem Limited, Swindon, United Kingdom

[*] Notice: This patent is subject to a terminal disclaimer.

[21] Appl. No.: 08/825,833

[22] Filed: Apr. 4, 1997

Related U.S. Application Data

[63] Continuation of application No. 08/638,055, Apr. 25, 1996, abandoned, which is a continuation of application No. 08/442,030, May 16, 1995, Pat. No. 5,513,059, which is a continuation of application No. 08/291,782, Aug. 17, 1994, Pat. No. 5,416,663, which is a continuation of application No. 08/030,307, May 13, 1993, abandoned.

[30] Foreign Application Priority Data

Sep. 28, 1990 [GB] United Kingdom .................. 9021222

[51] Int. Cl.⁶ .................................... H02H 9/04
[52] U.S. Cl. ........................... 361/119; 361/111
[58] Field of Search ............... 361/56, 91, 111, 361/118, 119

[56] References Cited

U.S. PATENT DOCUMENTS

| | | | |
|---|---|---|---|
| 3,725,613 | 4/1973 | Allen et al. | 179/175.3 |
| 3,793,535 | 2/1974 | Chowdhuri | 307/202 |
| 3,824,431 | 7/1974 | Schlicke | 317/61 |
| 3,925,624 | 12/1975 | Earle et al. | 179/81 R |
| 3,973,224 | 8/1976 | Gaule et al. | 333/12 |
| 4,021,760 | 5/1977 | Campi | 333/70 R |
| 4,037,139 | 7/1977 | Crask et al. | 361/58 |
| 4,068,282 | 1/1978 | Rigollet | 361/119 |

(List continued on next page.)

FOREIGN PATENT DOCUMENTS

| | | | |
|---|---|---|---|
| 590491 | 11/1989 | Australia | H02H 9/04 |
| 1286812 | 7/1991 | Canada | H02H 9/04 |
| 0017337A1 | 10/1980 | European Pat. Off. | H02H 9/06 |
| 86200284 | 2/1986 | European Pat. Off. | H02H 9/04 |
| 0186873A2 | 7/1986 | European Pat. Off. | H02H 9/04 |
| 0213657A1 | 3/1987 | European Pat. Off. | H02H 9/00 |
| 259-178 | 9/1987 | European Pat. Off. | H02H 9/04 |
| 259-179 | 9/1987 | European Pat. Off. | H02H 9/04 |
| 0 259 178 | 3/1988 | European Pat. Off. | H02H 9/04 |

(List continued on next page.)

OTHER PUBLICATIONS

"Overvoltage Protection Device" Olle Hjortsten et al. ERA, vol. 56, No. 6–7, pp. 48–50 and 53–54, 1983.

"The Protection of Telecommunications Installations From the Effects of Lightning" J.O. Colyer, pp. 26–28. Unknown source and unknown publication date.

(List continued on next page.)

*Primary Examiner*—Ronald W. Leja
*Attorney, Agent, or Firm*—Herbert G. Burkard; Harold T. Tsiang

[57] ABSTRACT

An arrangement for protecting an electrical circuit such as a telephone circuit from a voltage transient comprises a voltage clamp or foldback device (3) arranged to be connected between a current-carrying line (1) and ground (1'), a capacitor (2) in series with it, and an inductance (4) series connected in the line. During normal operation the arrangement acts as an LC filter whose high frequency break-point is determined by the capacitance of the voltage clamp or foldback device (3) and the value of the inductance (4) which are chosen to give a break point of 1 kHz to 10 MHz. However, when the arrangement is subjected to a voltage transient, the voltage clamp or foldback device (3) fires causing the break-point to fall to a value determined by the values of the capacitor (2) and inductance (4). The arrangement may be used, for example, to protect the circuit against a rapid voltage drop caused by the firing of another circuit protection device such as a gas discharge tube 5.

20 Claims, 2 Drawing Sheets

U.S. PATENT DOCUMENTS

| | | | |
|---|---|---|---|
| 4,079,211 | 3/1978 | Janssen | 179/81 R |
| 4,095,163 | 6/1978 | Montague | 323/8 |
| 4,156,838 | 5/1979 | Montague | 323/8 |
| 4,238,812 | 12/1980 | Middleman et al. | 361/106 |
| 4,282,555 | 8/1981 | Svedberg | 361/56 |
| 4,329,726 | 5/1982 | Middleman et al. | 361/58 |
| 4,434,396 | 2/1984 | Montague | 316/111 |
| 4,449,157 | 5/1984 | Chow . | |
| 4,455,586 | 6/1984 | McCartney | 361/56 |
| 4,456,940 | 6/1984 | Hammerberg et al. . | |
| 4,544,983 | 10/1985 | Anderson et al. . | |
| 4,563,720 | 1/1986 | Cark | 361/56 |
| 4,571,656 | 2/1986 | Ruckman . | |
| 4,577,255 | 3/1986 | Martin . | |
| 4,586,104 | 4/1986 | Standler | 361/91 |
| 4,625,255 | 11/1986 | Borkowicz et al. . | |
| 4,630,163 | 12/1986 | Cooper et al. | 316/56 |
| 4,661,878 | 4/1987 | Brown et al. . | |
| 4,661,979 | 4/1987 | Jakab | 379/412 |
| 4,683,514 | 7/1987 | Cook . | |
| 4,698,722 | 10/1987 | Kron . | |
| 4,729,055 | 3/1988 | Dorival et al. | 361/119 |
| 4,758,920 | 7/1988 | McCartney | 361/119 |
| 4,887,180 | 12/1989 | Climent et al. | 361/91 |
| 4,941,063 | 7/1990 | McCartney | 361/119 |
| 5,416,663 | 5/1995 | Atkins | 361/119 |
| 5,493,469 | 2/1996 | Lace | 361/119 |
| 5,513,059 | 4/1996 | Atkins | 361/56 |

FOREIGN PATENT DOCUMENTS

| | | | |
|---|---|---|---|
| 0259178A2 | 3/1988 | European Pat. Off. | H02H 9/04 |
| 0 292 082 | 11/1988 | European Pat. Off. | H02H 9/04 |
| 0292082A1 | 11/1988 | European Pat. Off. | H02H 9/04 |
| 0 338 107 | 10/1989 | European Pat. Off. | H02H 9/04 |
| 1513038 | 8/1971 | Germany | H02H 9/00 |
| 3030-824 | 8/1980 | Germany | C86E 23/11 |
| 52-013646 | 2/1977 | Japan | H02H 7/20 |
| 53-029551 | 3/1978 | Japan | H02H 9/04 |
| 356085910 | 7/1981 | Japan | H03F 1/52 |
| 56-148128 | 11/1981 | Japan | H02H 9/04 |
| 357030242 | 2/1982 | Japan | H01J 19/82 |
| 59-015227 | 1/1984 | Japan . | |
| 1594313 | 7/1981 | United Kingdom | H02H 9/04 |
| 2089173 | 6/1982 | United Kingdom | H04B 1/02 |
| 2102218 | 1/1983 | United Kingdom | H02H 9/04 |
| 2111771 | 7/1983 | United Kingdom | H02H 9/02 |
| 2161659 | 1/1986 | United Kingdom | H02H 9/04 |
| 2172453 | 9/1986 | United Kingdom | H02H 9/04 |
| 2209893 | 5/1989 | United Kingdom | H02H 9/04 |
| WO83/00586 | 2/1983 | WIPO | H02H 9/04 |
| WO 90/00826 | 1/1990 | WIPO | H02H 9/04 |
| WO 90/00827 | 1/1990 | WIPO | H02H 9/04 |

OTHER PUBLICATIONS

Abstract & Drawings of Japanese Publication #60–242757 (A) DC Modem Dec. 1985.

Abstract & Drawings of Japanese Publication #61–187359 (A) Filter Device Feb. 1985.

Abstract & Drawings of Japanese Publication #63–59769 (A) Power Source Circuit Aug. 1986.

Br Telecom Technol J vol. 5, No 1, Jan. 1987, Electrical Protection of Telecomms Equipment R. C. Tilman & D. C. Croft.

British Telecommunications Engineering, vol. 4, Jan. 1986, Subscriber Line Interfaces J. R. W. Ames.

Cerberus Electronic, No. 38, Sep. 1975, Protection of Electronic Equipment Against Surge and Interference Voltages.

EDN Jun. 27, 1985, Gas–discharge Systems Furnish Circuit Protection, Nick Yapoujian, general Protection Co.

Electrical Communication, vol. 49, No. 2, 1974, Overvoltage Protection of Telephone Switching Equipment Containing Electronic Components, R. Mosch, Standard Elektrik Lorenz AG, Stuttgart, Federal Republic of Germany.

Electrical Communication, vol. 54, No. 2, 1979, Overvoltages on Subscriber Lines, J. Dutt, Standard Elektrik Lorenz AG. Stuttgart, Federal Republic of Germany.

Electrical Construction and Maintenance, Jun. 1980, Suppressing Overvoltage Transients, Irwin Lazar, Consulting Electrical Engineer, The Heyward–Robinson co., Inc., New York, N.Y.

Technology Applications Department, BTRL Ipswich Suffolk, UK, The Electrical Protection of Telecommunications Equipment, R. C. Tillman No Date.

1984 IEEE, Paper No. PCIC–84–4, Suppression of Transient Overvoltages on Instrumentation Wiring Systems, Rapp W. Crook, E. I. du Pont de Nemours & Co.

TELE 2 1973, Overvoltages Caused by Lighting and Their Effect on Telecommunication Equipment, Arne Mode, Per-–Olof Persson, Gustaf Adolf Pettersson, Lars Söderlund and Kjell Wyke.

Telecommunications, Sep. 1976, Protection of Subscriber Equipment Against Transient Line Voltages, E. A. Feuell, Standard Telecommunication Laboratories Ltd., Harlow, Essex, UK.

Standard Telecommunication Laboratories Limited, Harlow, Essex, UK, Protection of Subscriber's Equipment Against Transient Line Voltages, E. A. Feuell 1976.

Abstract & Drawings of Japanese Publication #1436625, Jul. 4, 1973, Overvoltage Protective Circuits.

Post Office, Apr. 5, 1974 [May 18, 1973] 23792/73 Heading H2H, #1412158 Voltage Surge Protective Arrangements.

Brown Boveri & Cie AG, Mar. 19, 1973 [Mar. 18, 1972] 13085/73 Headings H2H & H2K [also in Division H3], #1387379 Protective Arrangements.

International Standard Electric Corp., Apr. 10, 1973 [Apr. 11, 1972], 17123/73 Heading H2K [also in Division H3], #1387386 Protective Arrangements.

RJ Redding, Jun. 29, 1970 [Jul. 3, 1969], 33504/69 Heading H2H [also in Division G3], #1310354 Excess Voltage and Current Protection.

Raychem Ltd., W02 W06, 88–065954/10 EP 259–177–A, Electric Circuit Protection Arrangement Mar. 1988.

Philips Patent GMBH U24, 86–233204/36 EP–193–989–A, Overvoltage Protection Circuit For Wide Band Digital System.

Protection Against Transient Voltages by E. A. Feuell of Standard Telecommunications Laboratories No Date.

European Patents Report Week 8637, Philips Patent GMBH U24, 86–233204/36, EP–193–989–A, Overvoltage Protection Circuit for Wide Band Digital System Feb. 1986.

European Patents Report Week 8628, Nippon Teleg & Teleph, U24, 86–177474/28, EP–186–873–A, Lighting Surge Protector Circuit For Communication Equipment Dec. 1985.

Electric Power Engineering Week E11, Licentia Patent GMBH X13 C8623 E/11, DE 3030–824, Explosion Proofed Power Supply For Data Equipment Aug. 1980.

BOPI No. 44–1978, Mar. 3, 1977, 2.382.787.

BOPI No. 44–1978, Mar. 3, 1977, 2.382.788.

Int. Cl. (4th Edition, 1984) vol. 8, Section H, H 02H Emergency Protective Circuit Arrangements.

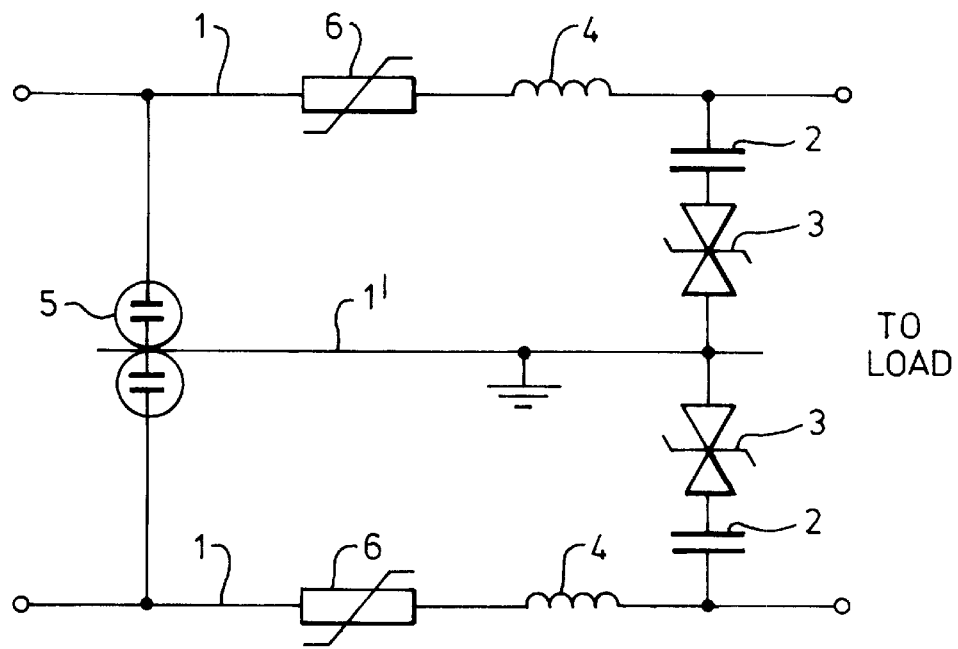
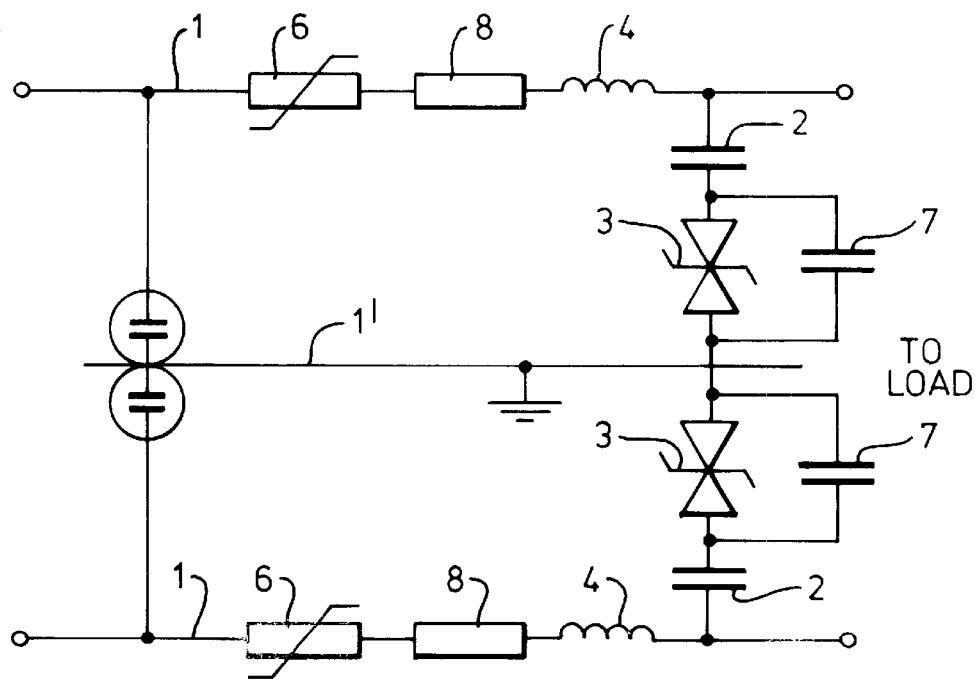

ARRANGEMENT FOR PROTECTING TELECOMMUNICATIONS EQUIPMENT FROM VOLTAGE TRANSIENTS

CROSS-REFERENCE TO RELATED APPLICATIONS

This application is a continuation of application Ser. No. 08/638,055, filed on Apr. 25, 1996, now abandoned, which is a continuation of application Ser. No. 08/442,030, filed on May 16, 1995, now U.S. Pat. No. 5,513,059, which is a continuation of application Ser. No. 08/291,782, filed on Aug. 17, 1994, now U.S. Pat. No. 5,416,663, which is a continuation of application Ser. No. 08/030,307, filed on May 13, 1993, now abandoned.

BACKGROUND OF THE INVENTION

1. Field of the Invention

This invention relates to the protection of telecommunications equipment from voltage transients.

2. Introduction to the Invention

Voltage transients may be produced in electrical circuits by a variety of methods, for example by lightning, electrostatic discharge or pulses generated by operation of electrical equipment. These phenomena may all induce very large currents on cables and structures such as, for example telecommunications equipment, aircraft, and ships which can penetrate and damage electrical systems, either causing hardware damage such as semiconductor damage or electronic upset such a transmission loss or loss of stored data.

Electrostatic discharges are extremely fast discharges from a capacitor such as a human body. These discharges, because they can be so local, present a great threat to the individual electronic components. Induced electrical transients caused by lightning represent a threat to electrical/electronic equipment especially in telecommunications equipment.

SUMMARY OF THE INVENTION

According to the present invention, there is provided an arrangement for protecting an telecommunications equipment from a voltage transient, which comprises a voltage clamping device connected or arranged to be connected between a current-carrying line of the circuit and ground, a capacitor having a capacitance up to 1 MF connected in series with the voltage clamping or device and an inductance of from 1 mH to 100 mH series connected in the line, and a high energy foldback device connected between the current-carrying line and ground, under normal operating conditions the arrangement acting as an LC filter whose high frequency break-point is determined by the capacitance of the voltage clamping device and any additional capacitor optionally connected in parallel therewith, and the inductance and is in the range of from 1 kHz to 10 MHz preferably from 10 kHz to 5 MHz, the high frequency break-point falling when the arrangement is subjected to a voltage transient sufficient to cause the voltage clamping device to conduct, to a value that is determined by the values of the capacitor and the inductance.

DETAILED DESCRIPTION OF THE INVENTION

The voltage clamping device may be selected from a number of devices that have voltage limiting properties, for example a back-to-back diode arrangement in which the diodes may comprise semiconductor diodes, avalanche diodes or Zener diodes. Alternatively, non-linear resistors may be employed such as zinc oxide, silicon carbide or other varistor materials. The voltage clamping device may, if desired, comprise a MIM and nin device or a gaseous voltage regulator. MIM and nin devices that may be employed in the invention are described in our International Applications Nos. PCT/GB89/00809 and PCT/GB89/00808.

The preferred voltage clamping devices are bidirectional clamping diodes, for example as sold under the tradename TRANZORB. The clamping devices will normally have a stray capacitance in the range of from 10 pF to 10 nF and especially from 100 pF to 5 nF. In some instances the stray capacitance of the voltage clamping device may be too low, in which case a small capacitor may be connected in parallel with it to bring the resultant capacitance within the preferred range.

As stated above the inductance has a value in the range of from 1 mH to 100 mH and preferably it has a value of up to 1 mH. This may, for example be achieved by utilizing the stray inductance of a wire wound resistor. In some circumstances it may be preferable instead to employ a small inductor. The inductance will normally have an associated resistance of from 1 to 50 ohms, especially from 3 to 10 ohms. The resistance may be chosen so that the total resistance of all series connected components in the line is within acceptable limits.

The capacitor has a capacitance of up to 1 mF, and preferably has a capacitance of at least 100 pF, especially at least 10 nF. In most cases it will be preferred for the capacitor to have a capacitance that is at least ten times the stray capacitance of the voltage clamping device, and preferably at least 100 times the stray capacitance. Where the capacitance is 100 times that of the voltage clamping device the high frequency break point should fall when subjected to a transient, to about one tenth the frequency of the break point under normal operating conditions.

The arrangement according to the invention has the advantage that under normal operating conditions it acts as a low pass filter with a relatively high break point, but that when it is subjected to a transient its high frequency gain is immediately reduced significantly. Thus, for example, where the break point falls to one tenth of its original frequency the gain magnitude at frequencies above the normal operating break point will be reduced by 40 dB.

The high-energy foldback device employed in the arrangement is intended to protect the circuit against higher energy, longer duration overvoltages. It may, for example, comprise a spark gap or gas discharge tube (GDT) or a voltage controlled triac connected between the conductor and ground for shunting high energy transients to ground. Such components can, in some circumstances, cause damage to the circuit they are used to protect by forming pulses having very rapidly changing voltages. For example, if a GDT is subjected to a transient that has a rising edge of 1 kV ms$^{-1}$ it may switch at, say, 500 V whereupon the transient voltage falls to zero in about 1 ns, thereby causing the transient that is transmitted to have a falling edge of 500 kV ms$^{-1}$. Such a rate of change of voltage can cause permanent damage to the circuit load. However, in the present invention, the reduction in the break point frequency caused by switching of the voltage clamp or will reduce the slope of the falling edge of that part of the transient that is let through the arrangement.

In addition the arrangement may include an overcurrent protection device series connected in the line between the additional, higher energy overvoltage device and the voltage clamping device in order to protect the circuit from long lasting overvoltages, for example caused by system failure, or by accidental or malicious connection of mains supply. Suitable devices include positive temperature coefficient (PTC) devices, eg. ceramic or polymeric PTC devices, preferably polymeric devices, for example as described in U.S. Pat. Nos. 4,238,812 and 4,329,726 to Middleman et al. Such devices are available from Raychem Corporation under the registered trademark "POLYSWITCH".

Since the circuit acts as a low pass filter both in its unswitched and switched state, it has the disadvantage that it cannot protect the circuit from DC or very low frequency overvoltages that are not great enough to cause the GDT or PTC device to switch. This may be overcome by connecting an additional voltage clamp or a foldback device across the capacitor. In this case the voltage clamp in series with the capacitor and the clamp or foldback device connected across the capacitor should have a combined clamping or threshold voltage that is greater than the normal equipment voltage. The term "foldback device" is used in this specification to mean a device which exhibits a high electrical resistance, e.g. at least 100 kohms, preferably at least 1 Mohm, and especially at least 10 Mohms, at low electrical voltages, but whose resistance falls from a high value to a low value, e.g. less than 10 ohms, when subjected to a high voltage (the lowest such voltage being referred to as the "threshold voltage"). The device will remain in its low resistance state only for as long as a small "holding current" is maintained through the device, otherwise it will automatically revert to its high resistance state. Suitable foldback devices include voltage controlled triacs, voltage controlled thyristors, and gas discharge tubes.

The arrangement according to the invention may be employed in telephone equipment where, for example, a balanced pair of lines having a common ground is used. In this case a circuit protection unit may be employed which comprised a pair of arrangements according to the invention arranged to be series connected in a pair of current-carrying lines and connected to a common ground.

DESCRIPTION OF THE DRAWINGS

Two forms of arrangement according to the invention will now be described by way of example with reference to the accompanying drawings in which:

FIG. 1 is a circuit diagram of one form of arrangement in according with the invention;

FIG. 2 is a diagram of the circuit of FIG. 1 with some of the parasitic values shown;

DETAILED DESCRIPTION OF THE DRAWINGS

Figure 3:
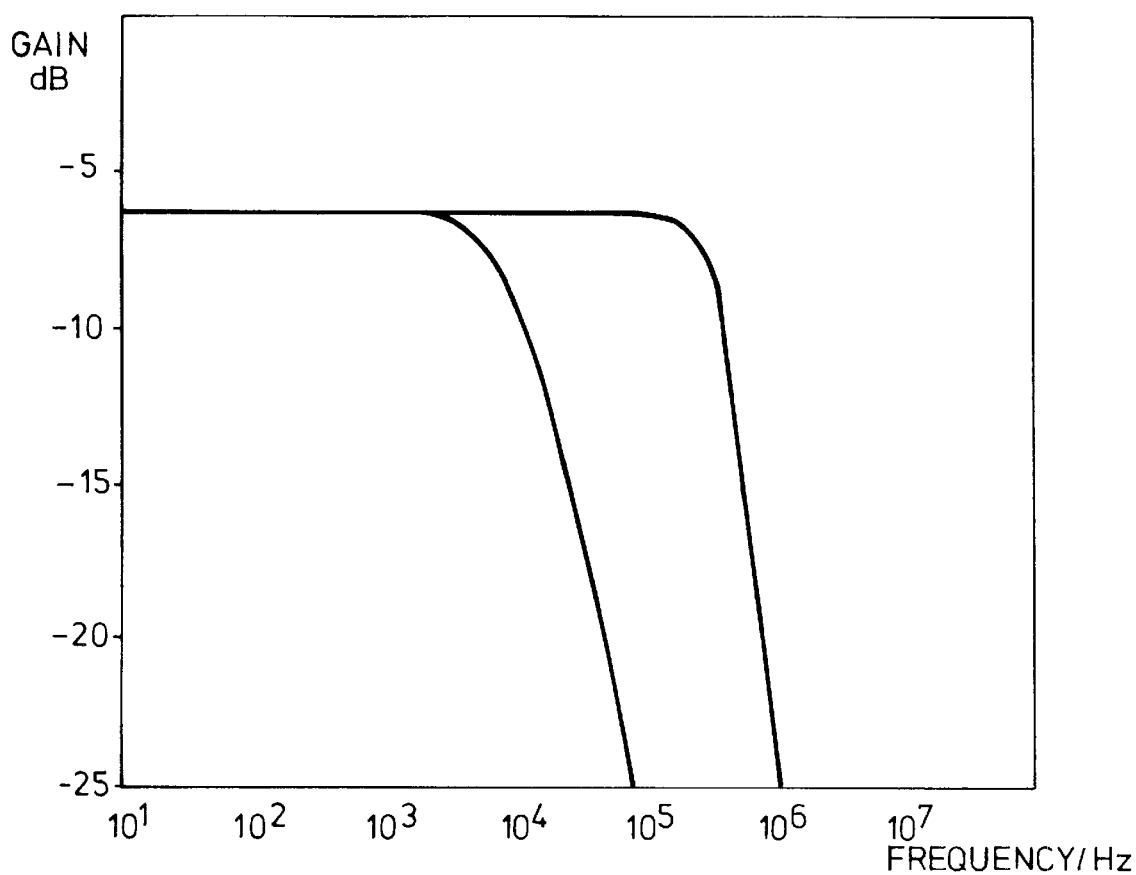
FIG. 3 is a Bode diagram showing the performance of the circuit of FIG. 1.

Referring to FIG. 1 of the accompanying drawings, a five terminal telephone circuit protection module has a balanced pair of lines 1 and a common ground line 1'. Two identical circuit protection arrangements are provided, one associated with each line of the module. The arrangements each comprise a bidirectional voltage clamping diode 3 connected between the line 1 and ground 1', a 100 nF capacitor 2 connected in series with the clamping diode 3, and a 200 uH inductor 4 in series connected in the line. In addition, the arrangement includes a GDT 5 connected between the line 1 and ground, and a PTC device 6 series connected in the line. The PTC device 6 has a low temperature resistance of about 6 ohms so that the total line resistance of the module is 6 ohms plus the resistance of the inductor 4.

FIG. 2 shows the circuit of FIG. 1 and indicates the most important stray quantities, namely the stray capacitance 7 of the voltage clamping device 3 and the resistance 8 of the inductor 4. Capacitance 7 is approximately 2 nF and resistance 8 is 5.6 ohms.

The performance of the arrangement is shown in FIG. 3. In normal operation the arrangement acts as a low pass RLC filter whose capacitance is given by the series connected capacitor 2 and stray capacitance of the clamping diode 3. When the unit is subjected to a voltage transient the clamping diode 3 will clamp the voltage between the line 1 and ground, with the result that the capacitance of the filter circuit is given by capacitor 2 above. The break point of the filter is therefore reduced to about one tenth the frequency of the original break point and the gain at frequencies above the normal operating break point is reduced by about 40 dB. When the GDT fires, the voltage on the line 1 will fall to zero within about 1 ns which corresponds to a voltage reduction of about 500 kV ms$^{-1}$. The reduced frequency band of the filter will, however, limit the rate of fall of the voltage at the output of the unit to about 500 V ms$^{-1}$.

Figure 4:
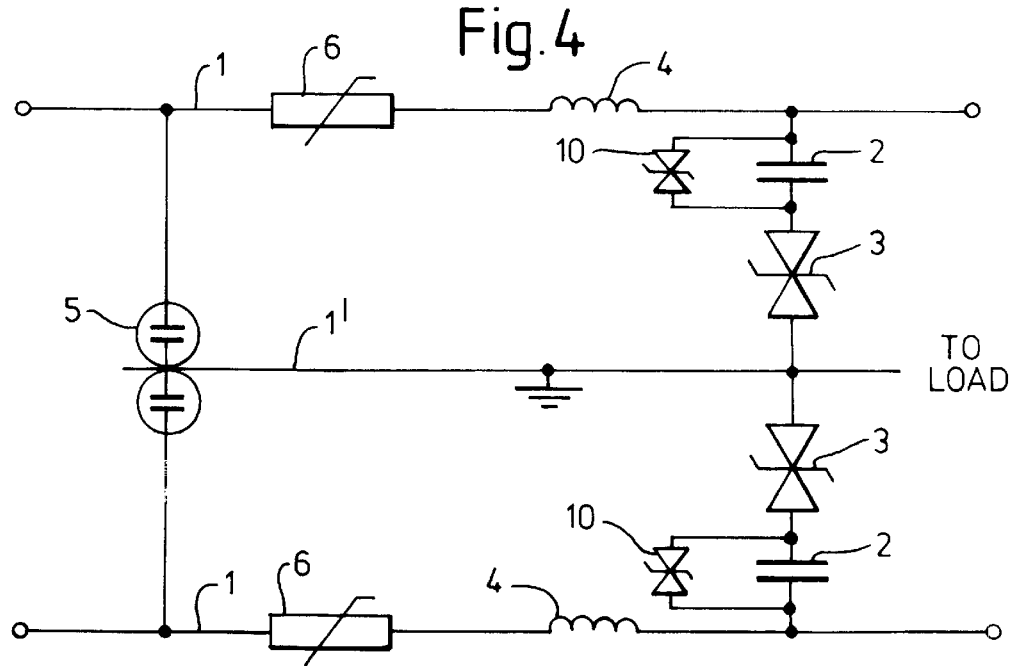
FIG. 4 is a circuit diagram of a modification of the circuit shown in FIG. 1.

FIG. 4 shows a modification of the circuit shown in FIG. 1 which will provide protection to a circuit against DC overvoltages. This circuit corresponds to that shown in FIG. 1 with the addition of a further bidirectional voltage clamping diode 10 connected across the capacitor 2. The clamping diode 10 has a breakdown voltage such that the sum of the breakdown voltages of the two diodes 3 and 10 is greater than the maximum system voltage.

I claim:

1. An arrangement for protecting an electrical circuit form a voltage transient, the electrical circuit comprising an electrical source, an electrical load, a current-carrying line connecting the source and the load, a ground, the arrangement comprising:

a. a first high energy foldback device, which, in use, is connected between
      (1) a first point on the current carrying line, and
      (2) ground;
   b. a series combination of
      (1) a first voltage clamping device which has a first capacitance, and
      (2) a first capacitor which has a second capacitance, the second capacitance having a value which
         (i) is at least 100 times the value of the first capacitance, and
         (ii) is up to 1 $\mu$f,
      the series combination, in use, being connected between
         (a) a second point on the current-carrying line, and
         (b) ground,
      the second point being between the first point and the load; and
   c. an inductor which has an inductance of from 1 $\mu$H to 100 mH, and which, in use, is series connected in the current-carrying line between the first point and the second point; and the arrangement, when in use in the circuit under normal operating conditions acting a first LC filter, the first LC filter comprising:

(A) the first capacitance, and
   (B) the inductance; and the arrangement, when in use in the circuit while the arrangement is subjected to a voltage transient sufficient to cause the first voltage clamping device to conduct, acting as a second LC filter, the second LC filter comprising:

(C) the second capacitance, and (D) the inductance.

2. An arrangement according to claim 1, comprising a second capacitor having a third capacitance, the second capacitor being connected in parallel with the first voltage clamping device, wherein the arrangement, when in use under normal operating conditions, acts as a third LC filter, the third LC filter comprising:

(A) the first capacitance;

(B) the third capacitance, and (C) the inductance; and the arrangement, when in use in the circuit while the arrangement is subjected to a voltage transient sufficient to cause the first voltage clamping device to conduct, acting as the second LC filter.

3. An arrangement according to claim 1, wherein the inductance has a value up to 1 mH.

4. An arrangement according to claim 1, which has a total series resistance in the current-carrying line in the range of from 1 to 50 ohms.

5. An arrangement according to claim 4, which has a total series resistance in the current-carrying line in the range of from 3 to 10 ohms.

6. An arrangement according to claim 1, which includes an overcurrent protection device series connected in the current-carrying line.

7. An arrangement according to claim 6 wherein the overcurrent protection device is a PTC device.

8. An arrangement according to claim 1, comprising a second voltage clamping or foldback device connected across the first capacitor.

9. An arrangement for protecting an electrical circuit form a voltage transient, the electrical circuit comprising an electrical source, an electrical load, a current-carrying line connecting the source and the load, a ground, and telecommunications equipment comprising a first high-energy foldback device, the first high-energy foldback device connected between a first point on the current-carrying line and ground, the arrangement comprising:

a. a series combination of (1) a first voltage clamping device which has a first capacitance, and (2) a first capacitor which has a second capacitance, the second capacitance having a value which (i) is at least 100 times the value of the first capacitance, and (ii) is up to 1 $\mu f$, the series combination, in use, being connected between (a) a second point on the current-carrying line, and (b) ground, the second point being between the first point and the load; and b. an inductor which has an inductance of from 1 $\mu H$ to 100 mH, and which, in use, is series connected in the current-carrying line between the first point and the second point; and the arrangement, when in use in the circuit under normal operating conditions acting as a first LC filter, the first LC filter comprising:

(A) the first capacitance, and (B) the inductance; and the arrangement, when in use in the circuit while the arrangement is subjected to a voltage transient sufficient to cause the first voltage clamping device to conduct, acting as a second LC filter, the second LC filter comprising:

(C) the second capacitance, and (D) the inductance.

10. An arrangement according to claim 9, comprising a second capacitor having a third capacitance, the second capacitor being connected in parallel with the first voltage clamping device, wherein the arrangement, when in use in the circuit under normal operating conditions, acts as a third LC filter, the third LC filter comprising:

(A) the first capacitance, (B) the third capacitance, and (C) the inductance; and the arrangement, when in use while the arrangement is subjected to a voltage transient sufficient to cause the first voltage clamping device to conduct, acting as the second LC filter.

11. An arrangement according to claim 9, wherein the inductance has a value up to 1 mH.

12. An arrangement according to claim 9, which has a total series resistance in the current-carrying line in the range of from 1 to 50 ohms.

13. An arrangement according to claim 12, which has a total series resistance in the current-carrying line in the range of from 3 to 10 ohms.

14. An arrangement according to claim 9, which includes an overcurrent protection device series connected in the current-carrying line.

15. An arrangement according to claim 14, wherein the overcurrent protection device is a PTC device.

16. An arrangement according to claim 9, comprising a second voltage clamping or foldback device connected across the first capacitor.

17. An electrical circuit, comprising an electrical source, an electrical load, a current-carrying line connecting the source and the load, a ground and an arrangement for protecting the electrical circuit from a voltage transient, the arrangement comprising:

a. a first high energy foldback device connected between (1) a first point on the current carrying line, and (2) ground;

b. a series combination of (1) a first voltage clamping device which has a first capacitance, and (2) a first capacitor which has a second capacitance, the second capacitance having a value which (i) is at least 100 times the value of the first capacitance, and (ii) is up to 1 $\mu f$, the series combination being connected between (a) a second point on the current-carrying line, and (b) ground, the second point being between the first point and the load; and c. an inductor which has an inductance of from 1 $\mu H$ to 100 mH, and which is series connected in the current-carrying line between the first point and the second point; and the arrangement, when in use under normal operating conditions acting as a first LC filter, the first LC filter comprising:

(A) the first capacitance, and (B) the inductance; and the arrangement, when in use while the arrangement is subjected to a voltage transient sufficient to cause the first voltage clamping device to conduct, acting as a second LC filter, the second LC filter comprising:

(C) the second capacitance, and (D) the inductance.

18. An electrical circuit according to claim 17, the arrangement comprising a second capacitor having a third capacitance, the second capacitor being connected in parallel with the first voltage clamping device, wherein the arrangement, when in use under normal operating conditions, acts as a third LC filter, the third LC filter comprising:

(A) the first capacitance, (B) the third capacitance, and (C) the inductance; and the arrangement, when in use while the arrangement is subjected to a voltage transient sufficient to cause the first voltage clamping device to conduct, acting as the second LC filter.

19. An electrical circuit, comprising an electrical source, an electrical load, a current-carrying line connecting the source and the load, a ground, telecommunications equipment comprising a first high-energy foldback device connected between a first point on the current-carrying line and ground, and an arrangement for protecting the electrical circuit from a voltage transient, the arrangement comprising:

a. a series combination of
  (1) a first voltage clamping device which has a first capacitance, and
  (2) a first capacitor which has a second capacitance, the second capacitance having a value which
    (i) is at least 100 times the value of the first capacitance, and
    (ii) is up to 1 $\mu$f, the series combination being connected between (a) a second point on the current-carrying line, and (b) ground, the second point being between the first point and the load; and b. an inductor which has an inductance of from 1 $\mu$H to 100 mH, and which is series connected in the current-carrying line between the first point and the second point; and the arrangement, when in use under normal operating conditions acting as a first LC filter, the first LC filter comprising:

(A) the first capacitance, and (B) the inductance; and the arrangement, when in use while the arrangement is subjected to a voltage transient sufficient to cause the first voltage clamping device to conduct, acting as a second LC filter, the second LC filter comprising:

(C) the second capacitance, and (D) the inductance.

20. An electrical circuit according to claim 19, the arrangement comprising a second capacitor having a third capacitance, the second capacitor being connected in parallel with the first voltage clamping device, wherein the arrangement, when in use under normal operating conditions, acts as a third LC filter, the third LC filter comprising:

(A) the first capacitance, (B) the third capacitance, and (C) the inductance; and the arrangement, when in use while the arrangement is subjected to a voltage transient sufficient to cause the first voltage clamping device to conduct, acting as the second LC filter.

* * * * *